March 6, 1956     J. L. BONANNO     2,736,981
FISHING LURES
Filed March 19, 1951
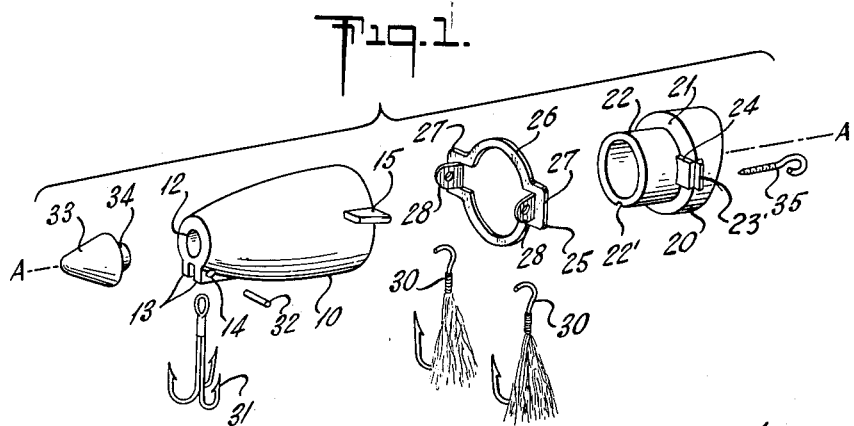
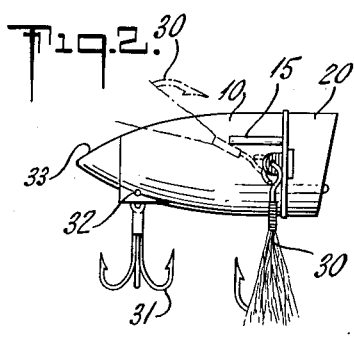
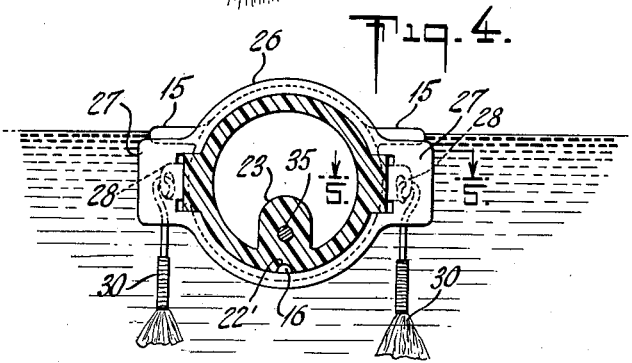
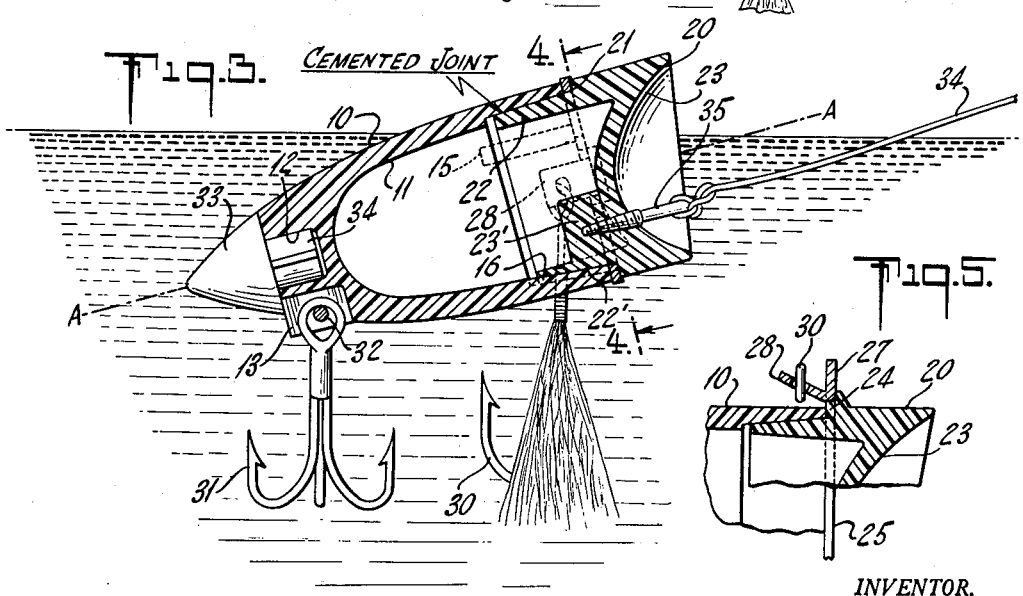
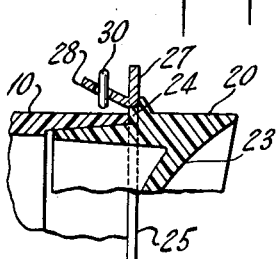
INVENTOR.
JOSEPH L. BONANNO
BY
*John M. Cole*
ATTORNEY.

United States Patent Office 2,736,981
Patented Mar. 6, 1956

2,736,981

FISHING LURES

Joseph L. Bonanno, Madison, N. J., assignor to Airex Manufacturing Co., Inc., New York, N. Y., a corporation of New York Application March 19, 1951, Serial No. 216,322

4 Claims. (Cl. 43—42.35)

The present invention relates to fishing lures and is more particularly directed towards fishing lures of the bait casting type provided with side and trailing hooks.

The present invention contemplates a lure of the so-called popper type wherein the body of the lure is made of two plastic molded parts and these parts carry the supports for the hooks, preferably two laterally disposed front hooks and a rear treble or gang-hook. The two hooks near the front at the sides of the lure are carried by a ring held in place by the plastic parts when cemented together. The front hooks preferably have limited vertical movement so that they will not rise too high.

The invention also contemplates a lure arranged so that the rear of the lure sinks lower into the water than the front of the lure, this sinking being obtained by means of a metal weight which continues the general contour of the lure.

Other and further objects will appear as the description proceeds.

The accompanying drawings show, for purposes of illustrating the present invention, one embodiment in which the invention may take form, it being understood that the drawings are illustrative of the invention rather than limiting the same.

In the accompanying drawings:

Figure 1 is an exploded perspective view showing the respective parts employed in making the lure;

Figure 2 is a side elevational view of the lure assembled;

Figure 3 is a longitudinal sectional view of the lure showing it floating on the water;

Figure 4 is a transverse sectional view through the lure taken along line 4—4 of Figure 3; and Figure 5 is a fragmentary sectional view taken along line 5—5 of Figure 4.

The lure shown herein is a lure intended to be cast out and retrieved by the fisherman and to float on the surface of the water. The body of the lure is in the form of two plastic moldings, preferably cellulose acetate butyrate, indicated generally at 10 and 20. The larger or rear plastic molding 10 is of generally frusto-conical shape as will be apparent from the drawings. It is hollow as indicated at 11, has a rearwardly opening recess 12 and underneath this recess are two vertical ribs 13 provided with a hole 14. Near the front, the plastic part 10 is provided with two laterally extending fins or wings 15, 15 above the axial line A—A through the lure and an aligning fin 16. The front or plug member 20 is of the same outside diameter as the outside diameter of part 10. It has a reducing shoulder indicated at 21 and a reduced diameter portion 22 with groove 22' adapted to fit closely the part 10. At the front, it is inwardly concave as indicated at 23 to have the desired effect on the water when suddenly pulled therethrough. It has a rearwardly extending lug or boss 23' and two spacers 24.

A sheet metal stamping 25 has a ring portion and has lateral extensions 27, 27 provided with apertured ears 28, 28 outside the front end of the rear body part 10.

Side hooks 30, 30 are secured in these ears. When assembled as shown, the ring is between the plastic parts and aligned by the lugs 24. The front ends of these hooks are underneath the wings or fins 15, 15 and these wings or fins limit the upward movement of the hooks 30 as indicated in dotted lines in Figure 2.

A treble or gang-hook 31 is secured to the rear of the lure by a pin 32 which passes through the holes 14. A conical metal member 33 has a reduced end 34 forced into the hole or recess 12. This metal member 13 is preferably made of aluminum. It contributes weight to the rear of the lure causing it to float in about the position indicated in Figure 3. The exact shape and mass of this weight may be varied so as to adjust the angle at which the lure floats and the amount of the lure which is submerged. The lure is attached to the fishing line 34 by a screw eye 35 threaded into the plastic material as indicated in the drawings. A small screw eye threaded into this material provides a very secure and quickly made connection between the line and lure.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A lure having a plastic body portion, a metal ring carried by the body portion and having laterally extending ears, and a hook pivotally carried by each ear, the body portion having projection extending laterally therefrom including fin-like elements which overlie the ears and limit the upward movement of the hooks.

2. A floating lure comprising a hollow substantially frustro-conical rear body part, a generally cylindrical front body part of the same outside diameter as the front end of the rear body part and having a reduced portion which enters the rear body part, the two parts being permanently secured together to form a chamber with predetermined buoyancy, a sheet metal ring surrounding the reduced portion of the front body part and disposed between the two parts, the ring having laterally extending perforated ears, hooks having eyes secured on the perforated ears, the front end of the rear body part having stop members which overlie the perforated ears and limit the upward swinging of the hooks, the lower rear end of the rear part being bifurcated and carrying a transverse pin, a gang-hook secured to the pin and having limited movement about the pin as an axis, and a conical-shaped weight at the rear of the rear part, the weight continuing the contour of the said rear part and sinking the rear part lower in the water than the front part.

3. In a lure, a rear body part in the form of a plastic molding open at the front end, generally symmetrical about a normally horizontal axis and of decreasing external and internal diameter from front to rear, the part being closed at the rear and having a rearwardly opening recess formed therein, the part having at the front end above the axis two laterally extending fins and at the rear end below the axis longitudinally extending apertured ribs, a plug part also in the form of a plastic molding telescopically fitting the front end of the rear body part, a metal ring secured between the body part and plug, and having apertured ears below the fins, hooks secured to the ears, a gang-hook secured to the ribs at the rear of the body part, and a weight carried in the recess to depress the rear of the lure as it floats in water.

4. A floating lure having a two-part plastic body, the rear part being hollow and rearwardly tapering, the front part being short and telescopically fitting the rear part, a thin metal ring carried about the smaller of the telescopically fitting portions and between the front and rear parts, the ring having laterally extending ears, the plastic parts being cemented together to provide predetermined and constant buoyancy, trailing hooks carried by the ears, a cross-pin near the rear of the body, a gang-hook pivotally carried by the cross-pin to provide eccentric weight and swing the body about its axis, the rear part of the body having a counterbore formed therein, and a metal weight secured in the counterbore and of continuing tapered shape, the rear plastic body part having projections extending laterally therefrom including elements above the ears for limiting the upward movement of the hooks and for providing lift to the front end of the lure as it is pulled through the water.

References Cited in the file of this patent

UNITED STATES PATENTS

| Number | Name | Date |
|---|---|---|
| 1,361,067 | Jordan | Dec. 7, 1920 |
| 1,778,065 | Davenport | Oct. 14, 1930 |
| 1,878,015 | Steffensen | Sept. 20, 1932 |
| 1,900,339 | Harrell | Mar. 7, 1933 |
| 1,906,791 | Grossmann | May 2, 1933 |
| 2,112,385 | Smith | Mar. 29, 1938 |
| 2,242,726 | Leusch | May 20, 1941 |
| 2,242,965 | Adams | May 20, 1941 |
| 2,467,971 | Frair | Apr. 19, 1949 |
| 2,510,566 | Flaherty | June 6, 1950 |
| 2,556,507 | Tallaksen | June 12, 1951 |
| 2,568,488 | Cummins | Sept. 18, 1951 |
| 2,641,862 | Poe | June 16, 1953 |

FOREIGN PATENTS

| Number | Country | Date |
|---|---|---|
| 487,609 | Great Britain | June 23, 1938 |